United States Patent
Narukawa

[11] Patent Number: 5,243,442
[45] Date of Patent: Sep. 7, 1993

[54] COPYING MACHINE EQUIPPD WITH AN IMAGE EDITOR

[75] Inventor: Atsushi Narukawa, Yamatokoriyama, Japan

[73] Assignee: Sharp Kabushiki Kaisha, Osaka, Japan

[21] Appl. No.: 654,308

[22] Filed: Feb. 12, 1991

[30] Foreign Application Priority Data

Feb. 16, 1990 [JP] Japan ................................ 2-36859

[51] Int. Cl.$^5$ .............................................. H04N 1/38
[52] U.S. Cl. ..................... 358/453; 358/452
[58] Field of Search ............... 358/452, 453, 475, 477, 358/478; 382/47, 48, 55; 355/40, 218

[56] References Cited

U.S. PATENT DOCUMENTS

| | | | |
|---|---|---|---|
| 4,855,786 | 8/1989 | Ohira et al. | |
| 4,893,258 | 1/1990 | Sakuragi | 382/47 |
| 4,920,502 | 4/1990 | Yamada | 358/451 |
| 4,965,678 | 10/1990 | Yamada | 358/443 |
| 5,029,224 | 7/1991 | Fujisawa | 358/453 |
| 5,086,317 | 2/1992 | Sugishima et al. | 355/218 |
| 5,119,445 | 6/1992 | Suzuki et al. | 382/55 |

FOREIGN PATENT DOCUMENTS

| | | |
|---|---|---|
| 0081767 | 6/1983 | European Pat. Off. |
| 56-21469 | 2/1981 | Japan |
| 57-56859 | 4/1982 | Japan |
| 60-5668 | 1/1985 | Japan |
| 62-154860 | 7/1987 | Japan |
| 63-303569 | 12/1988 | Japan |

OTHER PUBLICATIONS

European Search Report in corresponding European Patent Application issued by European Patent Office on Sep. 10, 1992.

*Primary Examiner*—Edward L. Coles, Sr.
*Assistant Examiner*—Kim Yen Vu
*Attorney, Agent, or Firm*—David G. Conlin; Henry D. Pahl, Jr.

[57] ABSTRACT

A copying machine which compares between the longitudinal dimension and the crosswise dimension of each line mark based on an output from the image information reading means and decides the coordinates of a longer line mark as the effective coordinates for the line mark, and determines an editing area based on the coordinates of each line mark decided so that the editing is performed on the image in the editing area in accordance with the preset marker editing mode.

3 Claims, 3 Drawing Sheets

COPYING MACHINE EQUIPPD WITH AN IMAGE EDITOR

BACKGROUND OF THE INVENTION

1. Field of the Invention

The present invention relates generally to a copying machine, and more particularley to a copying machine equipped with an image editor adapted to edit an image on the basis of line marks marked on a document.

2. Description of the Prior Art

A copying machine is known which is capable of reading a mark or marks on a document and editing on the basis of the marks read out from the document as desired: for example, a masking is effected by erasing an image in the area indicated by the mark or the trimming is effected by erasing images in other areas than the area indicated by the mark. An example of such a marker editing function is shown in FIG. 4(a), wherein a first line mark 72 extending in the scanning direction of an optical system and a second line mark 73 extending orthogonal to the scanning direction are marked on a document 71 and the area indicated by the coordinates of these first and second line marks 72 and 73 is determined as an editing area 74.

However, with this known art copying machine, in the editing mode in which the editing area is determined by the coordinates in the scanning direction of the optical system and the coordinates orthogonal to that direction, as described above, if the longitudinal and crosswise dimensions of each of the line marks 72 and 73 are respectively greater than a given dimension, both dimensions are recognized as constituting separate coordinates. This means that when, as shown in FIG. 4(b), a first line mark 75 and a second line mark 76 are both marked in thick lines on a document 71, the widths of the first and second line marks 75 and 76 are also recognized as constituting coordinates, resulting in the setting of an undesired editing area 77 in addition to the desired editing area 74. Therefore, the problem is that editing is also done on the editing area 77 and a desired image cannot be produced in the marker editing mode.

Another editing method is also known, which is disclosed in Japanese Laid-Open Patent Publication No. 57-56859. Under this method a portion of a document to be copied is previously marked in a distinct color against a portion to be not copied, and the color outlined portion is scanned by an extra sensor. In response to the signal, a latent image in an area other than the colored outlined portion is erased. This method must have multiple sensors arranged in a main scanning direction so as to detect a copying area.

SUMMARY OF THE INVENTION

The copying machine of this invention, which overcomes the above-discussed and numerous other disadvantages and deficiencies of the prior art, comprises an image information reading means for reading image information from a document through a light reflected from the document, an image editing means for selecting a marker editing mode in which the edition is effected for an editing area determined by the coordinates of a first line mark marked on the document and extending in the scanning direction of the optical system, and those of a second line mark orthogonal to the first line mark, a mark judging means for comparing between the longitudinal dimension and the crosswise dimension of each line mark based on an output from the image information reading means and judging the coordinates of a longer mark as effective coordinates of the line mark, and a control means for controlling the image editing means so as to effect the editing in the selected marker editing mode for the determined editing area based on the effective coordinates of each line mark decided by the mark judging means.

In a preferred embodiment, the image information reading means is a charge coupled device.

In another preferred embodiment, the image editing means comprises a blank lamp and a blank lamp control connected to the image information reading means so that the blank lamp removes any charge from other areas than an image-forming area.

Thus, the invention described herein makes possible the objective of providing a copying machine capable of effecting the editing only in an effective area, thereby preventing the editing from taking place in an undesired area.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1A:
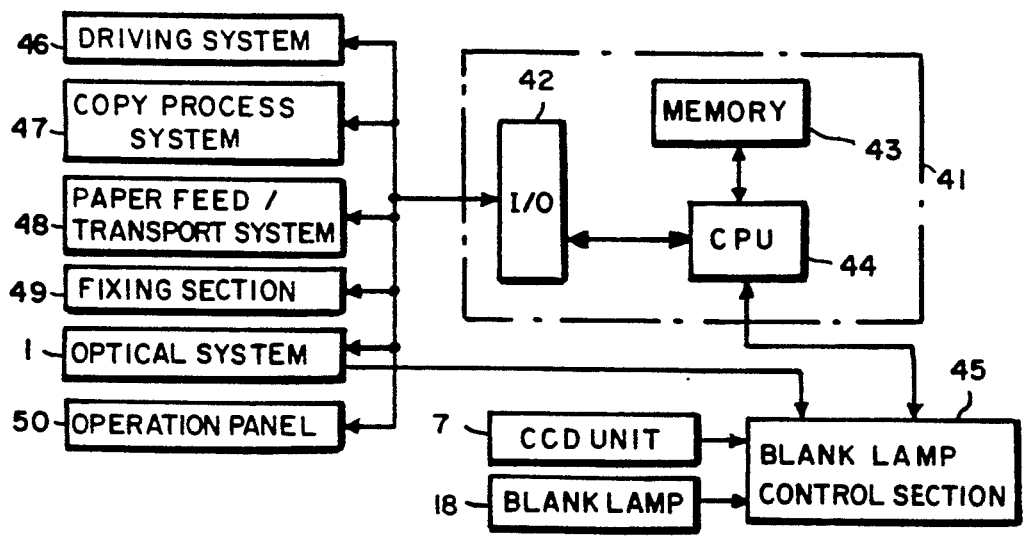
FIG. 1(a) is a block diagram showing the essential parts of the control system of a copying machine.

A typical example of the present invention is described with reference to FIGS. 1 to 3:

The illustrated copying machine is provided with an optical system 1 for scanning a document (not shown) placed on a document table 15 with light from a copy lamp 2 and directing the light reflected therefrom onto a photosensitive drum 16. The optical system 1 comprises, in addition to the copy lamp 2, a first mirror 3, a second mirror 4, a third mirror 5, a mirror motor 6 for driving the second mirror 4 and the third mirror 5 in integral fashion, a lens unit 8, a lens motor 9 for driving the lens unit 8, a fourth mirror 10, a fifth mirror 11, a mirror motor 12 for driving the fourth mirror 10 and the fifth mirror 11 in integral fashion, a filter 13, and a sixth mirror 14. Adjacent to one side of the lens unit 8, there is disposed a CCD unit 7, an image information reading means. The CCD unit 7 is used to read the light reflected from the document, that is, the light image of the document, and convert it into electrical signals which are to be supplied to a blank lamp control section 18 hereinafter described.

The photosensitive drum 16 is disposed beneath the optical system 1, and around the photosensitive drum 16, there are disposed a main charger unit 17 for charging the surface of the photosensitive drum 16 to a prescribed potential; a blank lamp 18, an image editing means for removing any charge on the non-image areas of the photosensitive drum 16; a color developer tank 19; a main developer tank 20 for development with black toner; a toner box 21 for the main developer tank 20; a transfer charger 22 for transferring a toner image formed on the surface of the photosensitive drum 16 onto copy paper fed from a paper cassette 27 via a resist roller 26; a separation charger 23 for separating the copy paper from the photosensitive drum 16; a separation pawl 24 provided for the same purpose; and a cleaner unit 25 for collecting residual toner from the surface of the photosensitive drum 16.

In the transporting direction of the copy paper from the photosensitive drum 16, there are disposed a suction unit 29 having a suction belt 28, an upper heat roller 31 having a heater lamp 30, a lower heat roller 32, an upper separation pawl 33, a lower separation pawl 34, and a paper exit roller 35. A paper exit section 36 is provided adjacent to the paper exit roller 35.

Disposed above the suction unit 29 is a main motor 37 for delivering power to each driving system, while there are disposed, above the paper exit roller 35, a cooling fan motor 38 and an ozone absorbing filter 39.

Figure 2:
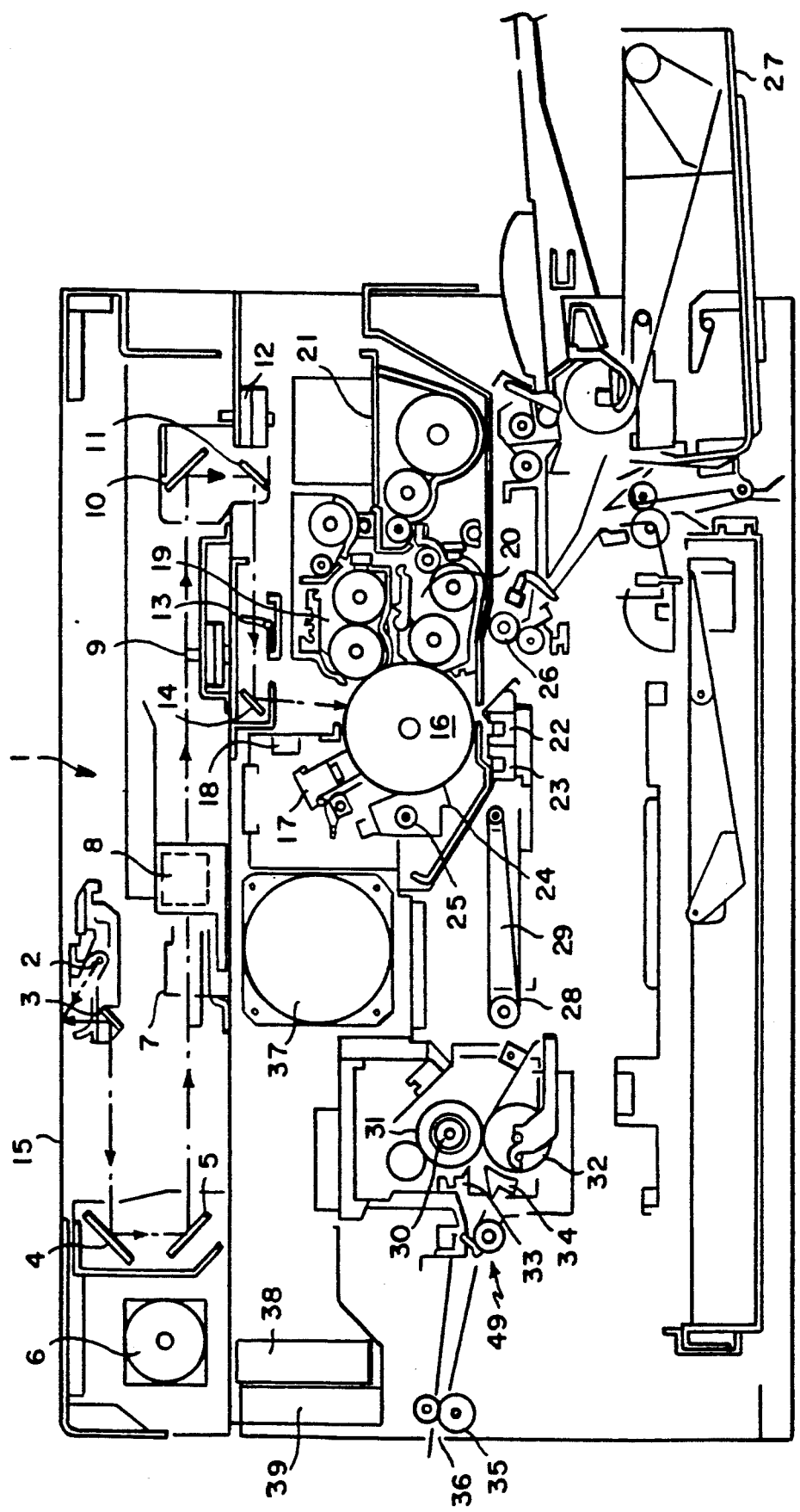
FIG. 2 is a schematic diagram showing the general construction of the copying machine.

The control system of the copying machine has the configuration shown in FIG. 1(a), comprising a main control section 41 consisting of an I/O interface 42, a memory 43 and a CPU 44, and a blank lamp control section 45 as a control means. Connected to the I/O interface 42 are: a driving system 46 such as the main motor 37; a copy process system 47 such as the main charger unit 17, the color developer tank 19, the main developer tank 20, the transfer charger 22, the separation charger 23, and the cleaner unit 25; a paper feed/transport system 48 comprising paper supply rollers and transport rollers; a fixing section 49 comprising the heater lamp 30, the upper heat roller 31, the lower heat roller 32, etc.; the optical system 1; and an operation panel 50. In response to operation key entries through the operation panel 50, the CPU 44 controls the operations of various means connected to the I/O interface 42 in accordance with control programs stored in the memory 43. The operation panel 50 has input keys, for setting the trimming mode in the marker editing mode, for example, various operation keys, a display section, etc.

Figure 1B:
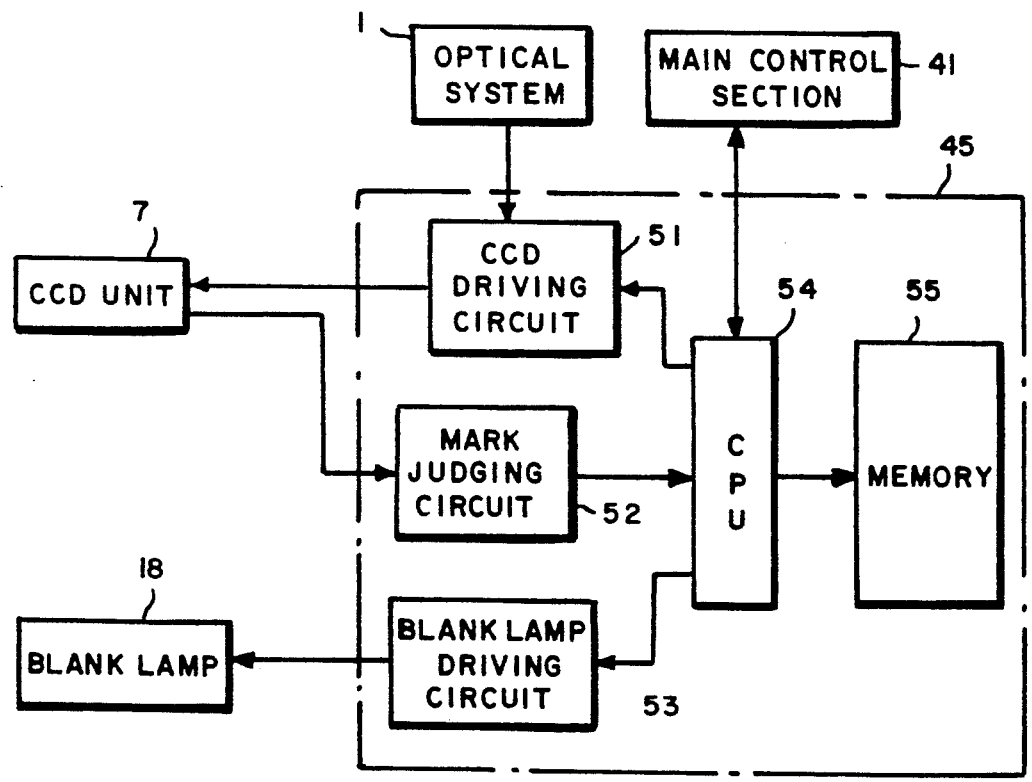
FIG. 1(b) is a block diagram of a blank lamp control section shown in FIG. 1(a)

On the other hand, the CPU 44 of the main control section 41, the optical system 1, the CCD unit 7, and the blank lamp 18 are connected to the blank lamp control section 45. As shown in FIG. 1(b), the blank lamp control section 45 comprises a CCD driving circuit 51, a mark judging circuit 52 which is a mark judging means, a blank lamp driving circuit 53, a CPU 54, and a memory 55. The optical system 1 and the CCD unit 7 are connected to the CCD driving circuit 51, the CCD unit 7 being also connected to the mark judging circuit 52, and the blank lamp 18 is connected to the blank lamp driving circuit 53. The CCD driving circuit 51, the mark judging circuit 52, and the blank lamp driving circuit 53 are connected to the CPU 54 to which the main control section 41 and the memory 55 are connected.

The mark judging circuit 52 compares the longitudinal dimension with the crosswise dimension on each of first and second line marks, the first line mark being marked on a document and extending in the scanning direction of the optical system I and the second line mark being marked on the document and extending in a direction orthogonal to the first line mark, and judges the coordinates of the longer dimension as the effective coordinates of each line mark while judging the shorter dimension as the width of the line mark.

The CPU 54 functions to control the operations of the CCD driving circuit 51, as well as to control the blank lamp driving circuit 53, hence the blank lamp 18, in accordance with the marker editing mode selected by an input through the operation panel 50 and with an output from the mark judging circuit 52. For example, when the trimming mode is selected in the marker editing mode, the CPU 54 determines as the trimming area the area indicated by the coordinates of the first and second line marks judged as effective by the mark judging circuit 52, stores the image data of the trimming area in the memory 55, calculates blank lamp data to erase the image in other areas than the trimming area, and supplies the blank lamp data to the blank lamp driving circuit 53.

The CCD driving circuit 51 drives the CCD unit 7 on instructions of the CPU 54. The blank lamp driving circuit 53 also drives the blank lamp 18 on instruction of the CPU 54.

Referring to the above construction, a general copying operation on the copying machine in the above example will be described.

In the copy process, a document placed on the document table 15 is first scanned with light by the copy lamp 2 in the optical system 1. In the mean time, the surface of the photosensitive drum 16 is charged to a prescribed potential by the main charger unit 17, after which the non-image areas of the photosensitive drum 16 are discharged by the blank lamp 18. The light reflected from the document is projected onto the photosensitive drum 16 through the first mirror 3, the second mirror 4, the third mirror 5, the lens unit 8, the fourth mirror 10, the fifth mirror 11, the filter 13, and the sixth mirror 14, thereby forming an electrostatic latent image on the surface of the photosensitive drum 16. The electrostatic latent image is developed into a toner image by the use of the color developer tank 19 or the main developer tank 20. The toner image is then transferred by the transfer charger 22 onto copy paper fed from the paper cassette 27. The copy paper onto which the toner image has been transferred is separated from the surface of the photosensitive drum 16 by means of the separation charger 23. Thereafter, the toner image formed on the copy paper is fixed to the copy paper by means of the upper heat roller 31 and the lower heat roller 32, and the copy paper onto which the toner image has been fixed is discharged to the outside of the copying machine through the paper exit section 36.

Next, the operation of the copying machine when the trimming mode is selected in the marker editing mode as a result of the operation of the marker editing mode key on the operation panel 50 will be described.

The light reflected from the document, i.e. the image light of the document, is fed into the CCD unit 7 where the light is read and converted into electrical signals. After that, the output signal of the CCD unit 7 is supplied to the blank lamp control section 45.

Figure 3:
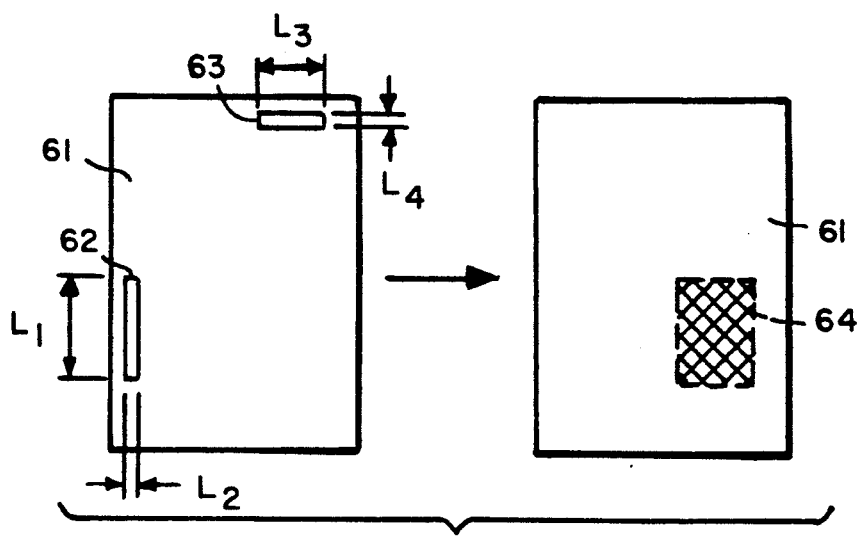
FIG. 3 is a diagram explaining first and second lines marked on a document and a trimming area set by the first and second line marks.
Figure 4A:
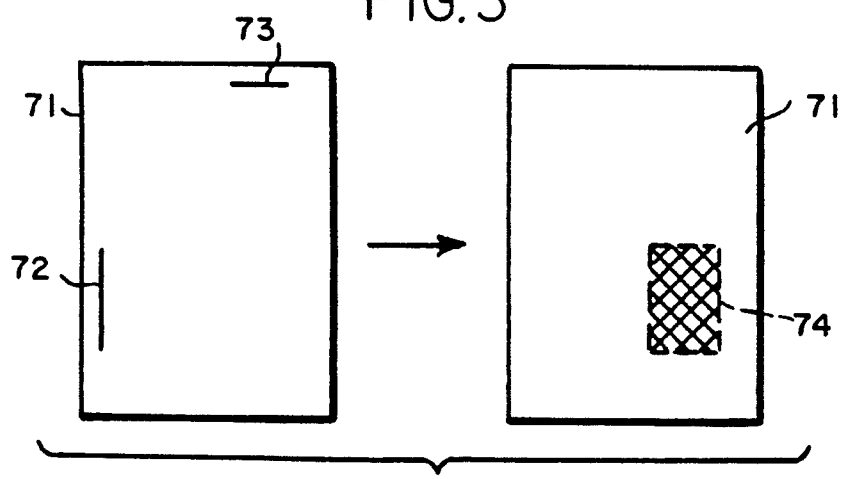
FIG. 4(a) is a diagram explaining first and second line marks marked in thin lines on a document and an editing area set by the first and second line marks.
Figure 4B:
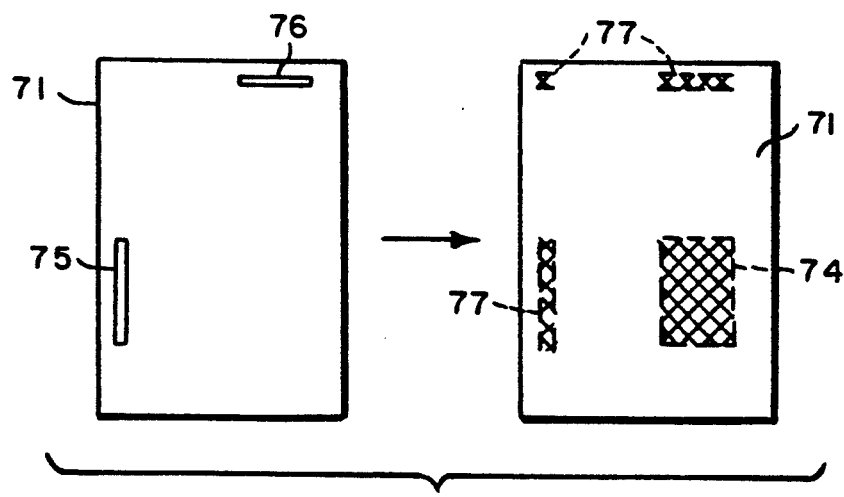
FIG. 4(b) is a diagram explaining first and second line marks marked in thick lines on a document and an editing area set by the first and second line marks.

Here, as shown in FIG. 3, when a first line mark 62 having a longitudinal dimension $L_1$ and a crosswise dimension $L_2$ and extending in the scanning direction of the optical system 1 and a second line mark 63 having a longitudinal dimension $L_3$ and a crosswise dimension $L_4$ and extending in a direction orthogonal to the first line mark 62 are marked on a document 61; the mark judging circuit 52 of the blank lamp control section 45 compares the longitudinal dimension $L_1$ with the crosswise dimension $L_2$ on the first line mark 62 and the longitudinal dimension $L_3$ with the crosswise dimension $L_4$ on the second line mark 63, and judges the coordinates of the longer dimensions as the effective coordinates of the first and second line marks 62 and 63, while judging the shorter dimensions as the widths of the first and second line marks 62 and 63. In the case shown in FIG. 3, since $L_1$ is greater than $L_2$ and $L_3$ is greater than $L_4$, the coordinates of $L_1$ and $L_3$ are judged as the effective coordinates of the first and second line marks 62 and 63, and the $L_2$ and $L_4$ are judged as the widths of the first and second line marks 62 and 63.

Therefore, the image data in a trimming area 64 indicated by the coordinates of the length $L_1$ of the first line mark 62 and the coordinates of the length $L_3$ of the second line mark 63 are stored in the memory 55. The CPU 54 calculates blank lamp data based on the image data stored in the memory 55 and according to the preset trimming mode in the marker editing mode, to erase the image in other areas than the trimming area 64, and supplies the blank lamp data to the blank lamp driving circuit 53. The blank lamp 18 is operated based on the blank lamp data to remove any charge on the area other than the trimming area 64 of the document 61, thereby preventing an electrostatic latent image to be formed on these areas. Thus, only the image in the trimming area 64 is produced on the copy paper.

As is apparent from above, with this construction, the editing area can be properly set even when the first line mark and the second line mark are both marked in thick lines on a document, thus enabling a desired image to be obtained in the marker editing mode.

A copying machine can be any type, including a digital copying machine.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A copying machine comprising an image information reading means for reading image information from a document through a light reflected from the document, an image editing means for selecting a marker editing mode in which the editing is effected for an editing area determined by the coordinates of a first line mark marked on the document and extending in the scanning direction of the optical system, and those of a second line marked on the document in a direction orthogonal to the first line mark, a mark judging means for comparing between the longitudinal dimension and the crosswise dimension of each line mark based on an output from the image information reading means and judging the coordinates of the longer dimension of each mark as effective coordinates of the respective line mark, and a control means for controlling the image editing means so as to effect the editing in the selected marker editing mode for the determined editing area based on the effective coordinates of each line mark as decided by the mark judging means.

2. A copying machine according to claim 1, wherein the image information reading means is a charge coupled device.

3. A copying machine comprising an image information reading means for reading image information from a document through a light reflected from the document, an image editing means for selecting a marker editing mode in which the editing is effected for an editing area determined by the coordinates of a first line mark marked on the document and extending in the scanning direction of the optical system, and those of a second line mark orthogonal to the first line mark, a mark judging means for comparing between the longitudinal dimension and the crosswise dimension of each line mark based on an output from the image information reading means and judging the coordinates of a longer mark as effective coordinates of the line mark, and a control means for controlling the image editing means so as to effect the editing in the selected marker editing mode for the determined editing area based on the effective coordinates of each line mark decided by the mark judging means, the image editing means further comprising a blank lamp and a blank lamp control connected to the image information reading means so that the blank lamp removes any charge from other area than an image-forming area.

* * * * *